(12) United States Patent
Miller

(10) Patent No.: US 7,160,222 B2
(45) Date of Patent: *Jan. 9, 2007

(54) CONTINUOUSLY VARIABLE TRANSMISSION

(75) Inventor: Donald C. Miller, Fallbrook, CA (US)

(73) Assignee: Fallbrook Technologies Inc., San Diego, CA (US)

( * ) Notice: Subject to any disclaimer, the term of this patent is extended or adjusted under 35 U.S.C. 154(b) by 165 days.

This patent is subject to a terminal disclaimer.

(21) Appl. No.: 11/006,217

(22) Filed: Dec. 6, 2004

(65) Prior Publication Data

US 2005/0096179 A1    May 5, 2005

Related U.S. Application Data

(63) Continuation of application No. 10/418,509, filed on Apr. 16, 2003, now Pat. No. 6,945,903, which is a continuation of application No. 10/141,652, filed on May 7, 2002, now Pat. No. 6,551,210, which is a continuation of application No. 09/695,757, filed on Oct. 24, 2000, now Pat. No. 6,419,608, said application No. 10/418,509 is a continuation-in-part of application No. 10/016,116, filed on Oct. 30, 2001, now Pat. No. 6,676,559, which is a continuation of application No. 09/823,620, filed on Mar. 30, 2001, now Pat. No. 6,322,475, which is a continuation of application No. 09/133,284, filed on Aug. 12, 1998, now Pat. No. 6,241,636.

(60) Provisional application No. 60/062,860, filed on Oct. 16, 1997, provisional application No. 60/056,045, filed on Sep. 2, 1997, provisional application No. 60/062,620, filed on Oct. 22, 1997, provisional application No. 60/070,044, filed on Dec. 30, 1997.

(51) Int. Cl.
*F16H 15/26* (2006.01)
(52) U.S. Cl. ........................................ 476/38
(58) Field of Classification Search ............. 475/192, 475/195, 189; 476/38, 37
See application file for complete search history.

(56) References Cited

U.S. PATENT DOCUMENTS

| 719,595 A | 2/1903 | Huss |
| 1,121,210 A | 12/1914 | Techel |
| 1,175,677 A | 3/1916 | Barnes |
| 1,858,696 A | 5/1932 | Weiss |
| 1,930,228 A | 3/1933 | Thomson |

(Continued)

FOREIGN PATENT DOCUMENTS

CN    1157379 A    8/1997

(Continued)

*Primary Examiner*—Dirk Wright
(74) *Attorney, Agent, or Firm*—Knobbe, Martens, Olson & Bear LLP

(57) ABSTRACT

A continuously variable transmission is disclosed for use in rotationally or linearly powered machines and vehicles. The single axle transmission provides a simple manual shifting method for the user. An additional embodiment is disclosed which shifts automatically dependent upon the rotational speed of the wheel. Further, the practical commercialization of traction roller transmissions requires improvements in the reliability, ease of shifting, function and simplicity of the transmission. The disclosed transmission may be used in vehicles such as automobiles, motorcycles, and bicycles. The transmission may, for example, be driven by a power transfer mechanism such as a sprocket, gear, pulley or lever, optionally driving a one way clutch attached at one end of the main shaft.

20 Claims, 17 Drawing Sheets

U.S. PATENT DOCUMENTS

| | | |
|---|---|---|
| 2,060,884 A | 11/1936 | Madle |
| 2,086,491 A | 7/1937 | Dodge |
| 2,112,763 A | 3/1938 | Cloudsley |
| 2,152,796 A | 4/1939 | Erban |
| 2,209,254 A | 7/1940 | Ahnger |
| 2,469,653 A | 5/1949 | Kopp |
| 2,596,538 A | 5/1952 | Dicke |
| 2,675,713 A | 4/1954 | Acker |
| 2,730,904 A | 7/1956 | Rennerfelt |
| 2,931,234 A | 4/1960 | Hayward |
| 2,931,235 A | 4/1960 | Hayward |
| 2,959,063 A | 11/1960 | Perry |
| 2,959,972 A | 11/1960 | Madson |
| 3,248,960 A | 5/1966 | Schottler |
| 3,273,468 A | 9/1966 | Allen |
| 3,280,646 A | 10/1966 | Lemieux |
| 3,487,726 A | 1/1970 | Burnett |
| 3,487,727 A | 1/1970 | Gustafsson |
| 3,661,404 A | 5/1972 | Bossaer |
| 3,695,120 A | 10/1972 | Titt |
| 3,707,888 A | 1/1973 | Schottler |
| 3,736,803 A | 6/1973 | Horowitz et al. |
| 3,768,715 A | 10/1973 | Tout |
| 3,996,807 A | 12/1976 | Adams |
| 4,177,683 A | 12/1979 | Moses |
| 4,227,712 A | 10/1980 | Dick |
| 4,391,156 A | 7/1983 | Tibbals |
| 4,459,873 A | 7/1984 | Black |
| 4,574,649 A | 3/1986 | Seol |
| 4,585,429 A | 4/1986 | Marier |
| 4,630,839 A | 12/1986 | Seol |
| 4,700,581 A | 10/1987 | Tibbals, Jr. |
| 4,735,430 A | 4/1988 | Tomkinson |
| 4,756,211 A | 7/1988 | Fellows |
| 4,856,374 A | 8/1989 | Kreuzer |
| 4,869,130 A | 9/1989 | Wiecko |
| 4,900,046 A | 2/1990 | Aranceta-Angoitia |
| 4,909,101 A | 3/1990 | Terry |
| 5,020,384 A | 6/1991 | Kraus |
| 5,037,361 A | 8/1991 | Takahashi |
| 5,069,655 A | 12/1991 | Schivelbusch |
| 5,121,654 A | 6/1992 | Fasce |
| 5,125,677 A | 6/1992 | Ogilvie et al. |
| 5,156,412 A | 10/1992 | Meguerditchian |
| 5,230,258 A | 7/1993 | Nakano |
| 5,236,211 A | 8/1993 | Meguerditchian |
| 5,236,403 A | 8/1993 | Schivelbusch |
| 5,318,486 A | 6/1994 | Lutz |
| 5,379,661 A | 1/1995 | Nakano |
| 5,383,677 A | 1/1995 | Thomas |
| 5,451,070 A | 9/1995 | Lindsay et al. |
| 5,601,301 A | 2/1997 | Liu |
| 5,645,507 A | 7/1997 | Hathaway |
| 5,651,750 A | 7/1997 | Imanishi et al. |
| 5,690,346 A | 11/1997 | Keskitalo |
| 5,899,827 A | 5/1999 | Nakano et al. |
| 5,967,933 A | 10/1999 | Valdenaire |
| 5,984,826 A | 11/1999 | Nakano |
| 6,000,707 A | 12/1999 | Miller |
| 6,053,841 A | 4/2000 | Kolde et al. |
| 6,066,067 A | 5/2000 | Greenwood |
| 6,071,210 A | 6/2000 | Kato |
| 6,095,940 A | 8/2000 | Ai et al. |
| 6,119,539 A | 9/2000 | Papanicolaou |
| 6,159,126 A | 12/2000 | Oshidan |
| 6,186,922 B1 | 2/2001 | Bursal et al. |
| 6,241,636 B1 | 6/2001 | Miller |
| 6,322,475 B1 | 11/2001 | Miller |
| 6,325,386 B1 | 12/2001 | Shoge |
| 6,390,946 B1 | 5/2002 | Hibi et al. |
| 6,406,399 B1 | 6/2002 | Ai |
| 6,419,608 B1 | 7/2002 | Miller |
| 6,461,268 B1 | 10/2002 | Milner |
| 6,551,210 B1 * | 4/2003 | Miller ........................ 475/189 |
| 6,575,047 B1 | 6/2003 | Reik et al. |
| 6,676,559 B1 | 1/2004 | Miller |
| 6,679,109 B1 | 1/2004 | Gierling et al. |
| 6,689,012 B1 | 2/2004 | Miller |
| 6,945,903 B1 | 9/2005 | Miller |
| 6,949,049 B1 | 9/2005 | Miller |
| 7,011,600 B1 | 3/2006 | Miller et al. |
| 7,036,620 B1 | 5/2006 | Miller et al. |
| 7,063,640 B1 | 6/2006 | Miller |
| 2004/0224808 A1 | 11/2004 | Miller et al. |
| 2005/0073127 A1 | 4/2005 | Miller |
| 2005/0079944 A1 | 4/2005 | Miller |
| 2005/0079948 A1 | 4/2005 | Miller et al. |
| 2005/0085326 A1 | 4/2005 | Miller |
| 2005/0085327 A1 | 4/2005 | Miller |
| 2005/0085334 A1 | 4/2005 | Miller et al. |
| 2005/0085335 A1 | 4/2005 | Miller et al. |
| 2005/0085336 A1 | 4/2005 | Miller et al. |
| 2005/0085337 A1 | 4/2005 | Miller et al. |
| 2005/0085338 A1 | 4/2005 | Miller et al. |
| 2005/0096176 A1 | 5/2005 | Miller |
| 2005/0096177 A1 | 5/2005 | Miller |
| 2005/0096178 A1 | 5/2005 | Miller |
| 2005/0111982 A1 | 5/2005 | Miller |
| 2005/0113208 A1 | 5/2005 | Miller |
| 2005/0113209 A1 | 5/2005 | Miller |
| 2005/0113210 A1 | 5/2005 | Miller |
| 2005/0117983 A1 | 6/2005 | Miller et al. |
| 2005/0119086 A1 | 6/2005 | Miller et al. |
| 2005/0119087 A1 | 6/2005 | Miller et al. |
| 2005/0119090 A1 | 6/2005 | Miller et al. |
| 2005/0119091 A1 | 6/2005 | Miller et al. |
| 2005/0119092 A1 | 6/2005 | Miller et al. |
| 2005/0119093 A1 | 6/2005 | Miller et al. |
| 2005/0119094 A1 | 6/2005 | Miller et al. |
| 2005/0124453 A1 | 6/2005 | Miller |
| 2005/0124455 A1 | 6/2005 | Miller |
| 2005/0159267 A1 * | 7/2005 | Miller et al. ................. 475/215 |
| 2005/0209041 A1 | 9/2005 | Miller |
| 2005/0255957 A1 * | 11/2005 | Miller et al. ................. 475/214 |

FOREIGN PATENT DOCUMENTS

| | | |
|---|---|---|
| DE | 498 701 | 5/1930 |
| DE | 2 310 880 | 9/1974 |
| DE | 21 36 243 | 1/1975 |
| DE | 39 40 919 A1 | 6/1991 |
| EP | 0 432 742 A1 | 12/1990 |
| EP | 635639 A1 | 1/1995 |
| GB | 592320 | 9/1947 |
| GB | 906 002 | 9/1962 |
| GB | 1 376 057 | 12/1974 |
| GB | 2 035 482 | 6/1980 |
| GB | 2 080 452 | 8/1982 |
| JP | 42-2844 | 2/1942 |
| JP | 47-20535 | 6/1972 |
| JP | 48-54371 | 7/1973 |
| JP | 50-70657 | 6/1975 |
| JP | 50-122600 | 10/1975 |
| JP | 51-150380 | 12/1976 |
| JP | 52-35481 | 8/1977 |
| JP | 53048166 A | 5/1978 |
| JP | 55-135259 | 4/1979 |
| JP | 02157483 | 6/1990 |
| JP | 411063130 | 3/1999 |
| JP | 2004162652 A | 6/2004 |
| JP | 8-247245 | 9/2004 |
| WO | WO99/20918 | 4/1999 |
| WO | WO138758 A1 | 5/2001 |

* cited by examiner

CONTINUOUSLY VARIABLE TRANSMISSION

RELATED APPLICATIONS

This application is a continuation of, and incorporates by reference in its entirety, U.S. application Ser. No. 10/418,509, filed Apr. 16, 2003 now U.S. Pat. No. 6,945,903, which is a continuation of U.S. application Ser. No. 10/141,652, filed May 7, 2002 now U.S. Pat. No. 6,551,210, which is a continuation of U.S. application Ser. No. 09/695,757, filed Oct. 24, 2000, now U.S. Pat. No. 6,419,608, which issued Jul. 16, 2002. The U.S. application Ser. No. 10/418,509 is also a continuation-in-part of U.S. application Ser. No. 10/016,116, filed on Oct. 30, 2001, now U.S. Pat. No. 6,676,559, which is a continuation of U.S. application Ser. No. 09/823,620, filed Mar. 30, 2001, now U.S. Pat. No. 6,322,475, which is a continuation of U.S. application Ser. No. 09/133,284, filed Aug. 12, 1998, now U.S. Pat. No. 6,241,636, which in turn claims priority to U.S. provisional application No. 60/062,860, filed on Oct. 16, 1997; U.S. provisional application No. 60/056,045, filed on Sep. 2, 1997; U.S. provisional application No. 60/062,620, filed on Oct. 22, 1997 and U.S. provisional application No. 60/070,044 filed on Dec. 30, 1997.

BACKGROUND OF THE INVENTION

1. Field of the Invention

The field of the invention relates to transmissions. More particularly the invention relates to continuously variable transmissions.

2. Description of the Related Art

In order to provide an infinitely variable transmission, various traction roller transmissions in which power is transmitted through traction rollers supported in a housing between torque input and output discs have been developed. In such transmissions, the traction rollers are mounted on support structures which, when pivoted, cause the engagement of traction rollers with the torque discs in circles of varying diameters depending on the desired transmission ratio.

However, the success of these traditional solutions has been limited. For example, in U.S. Pat. No. 5,236,403 to Schievelbusch, a driving hub for a vehicle with a variable adjustable transmission ratio is disclosed. Schievelbusch teaches the use of two iris plates, one on each side of the traction rollers, to tilt the axis of rotation of each of the rollers. However, the use of iris plates can be very complicated due to the large number of parts which are required to adjust the iris plates during shifting the transmission. Another difficulty with this transmission is that it has a guide ring which is configured to be predominantly stationary in relation to each of the rollers. Since the guide ring is stationary, shifting the axis of rotation of each of the traction rollers is difficult. Yet another limitation of this design is that it requires the use of two half axles, one on each side of the rollers, to provide a gap in the middle of the two half axles. The gap is necessary because the rollers are shifted with rotating motion instead of sliding linear motion. The use of two axles is not desirable and requires a complex fastening system to prevent the axles from bending when the transmission is accidentally bumped, is as often the case when a transmission is employed in a vehicle. Yet another limitation of this design is that it does not provide for an automatic transmission.

Therefore, there is a need for a continuously variable transmission with a simpler shifting method, a single axle, and a support ring having a substantially uniform outer surface. Additionally, there is a need for an automatic traction roller transmission that is configured to shift automatically. Further, the practical commercialization of traction roller transmissions requires improvements in the reliability, ease of shifting, function and simplicity of the transmission.

SUMMARY OF THE INVENTION

The present invention includes a transmission for use in rotationally or linearly powered machines and vehicles. For example the present transmission may be used in machines such as drill presses, turbines, and food processing equipment, and vehicles such as automobiles, motorcycles, and bicycles. The transmission may, for example, be driven by a power transfer mechanism such as a sprocket, gear, pulley or lever, optionally driving a one way clutch attached at one end of the main shaft.

In one embodiment of the invention, the transmission comprises a rotatable driving member, three or more power adjusters, wherein each of the power adjusters respectively rotates about an axis of rotation that is centrally located within each of the power adjusters, a support member providing a support surface that is in frictional contact with each of the power adjusters, wherein the support member rotates about an axis that is centrally located within the support member, at least one platform for actuating axial movement of the support member and for actuating a shift in the axis of rotation of the power adjusters, wherein the platform provides a convex surface, at least one stationary support that is non-rotatable about the axis of rotation that is defined by the support member, wherein the at least one stationary support provides a concave surface, and a plurality of spindle supports, wherein each of the spindle supports are slidingly engaged with the convex surface of the platform and the concave surface of the stationary support, and wherein each of the spindle supports adjusts the axes of rotation of the power adjusters in response to the axial movement of the platform.

In another embodiment, the transmission comprises a rotatable driving member; three or more power adjusters, wherein each of the power adjusters respectively rotates about an axis of rotation that is respectively central to the power adjusters, a support member providing a support surface that is in frictional contact with each of the power adjusters, a rotatable driving member for rotating each of the power adjusters, a bearing disc having a plurality of inclined ramps for actuating the rotation of the driving member, a coiled spring for biasing the rotatable driving member against the power adjusters, at least one lock pawl ratchet, wherein the lock pawl ratchet is rigidly attached to the rotatable driving member, wherein the at least one lock pawl is operably attached to the coiled spring, and at least one lock pawl for locking the lock pawl ratchet in response to the rotatable driving member becoming disengaged from the power adjusters.

In still another embodiment, the transmission comprises a rotatable driving member, three or more power adjusters, wherein each of the power adjusters respectively rotates about an axis that is respectively central to each of the power adjusters, a support member providing a support surface that is in frictional contact with each of the power adjusters, wherein the support member rotates about an axis that is centrally located within the support member, a bearing disc having a plurality of inclined ramps for actuating the rotation of the driving member, a screw that is coaxially and rigidly attached to the rotatable driving member or the bearing disc, and a nut that, if the screw is attached to the rotatable driving member, is coaxially and rigidly attached to the bearing disc, or if the screw is rigidly attached to the bearing disc, coaxially and rigidly attached to the rotatable driving member, wherein the inclined ramps of the bearing disc have a higher lead than the screw.

DETAILED DESCRIPTION OF THE PREFERRED EMBODIMENT

The following detailed description is directed to certain specific embodiments of the invention. However, the invention can be embodied in a multitude of different ways as defined and covered by the claims. In this description, reference is made to the drawings wherein like parts are designated with like numerals throughout. Furthermore, embodiments of the invention may include several novel features, no single one of which is solely responsible for its desirable attributes or which is essential to practicing the inventions herein described.

The present invention includes a continuously variable transmission that may be employed in connection with any type of machine that is in need of a transmission. For example, the transmission may be used in (i) a motorized vehicle such as an automobile, motorcycle, or watercraft, (ii) a non-motorized vehicle such as a bicycle, tricycle, scooter, exercise equipment or (iii) industrial equipment, such as a drill press, power generating equipment, or textile mill.

Figure 1:
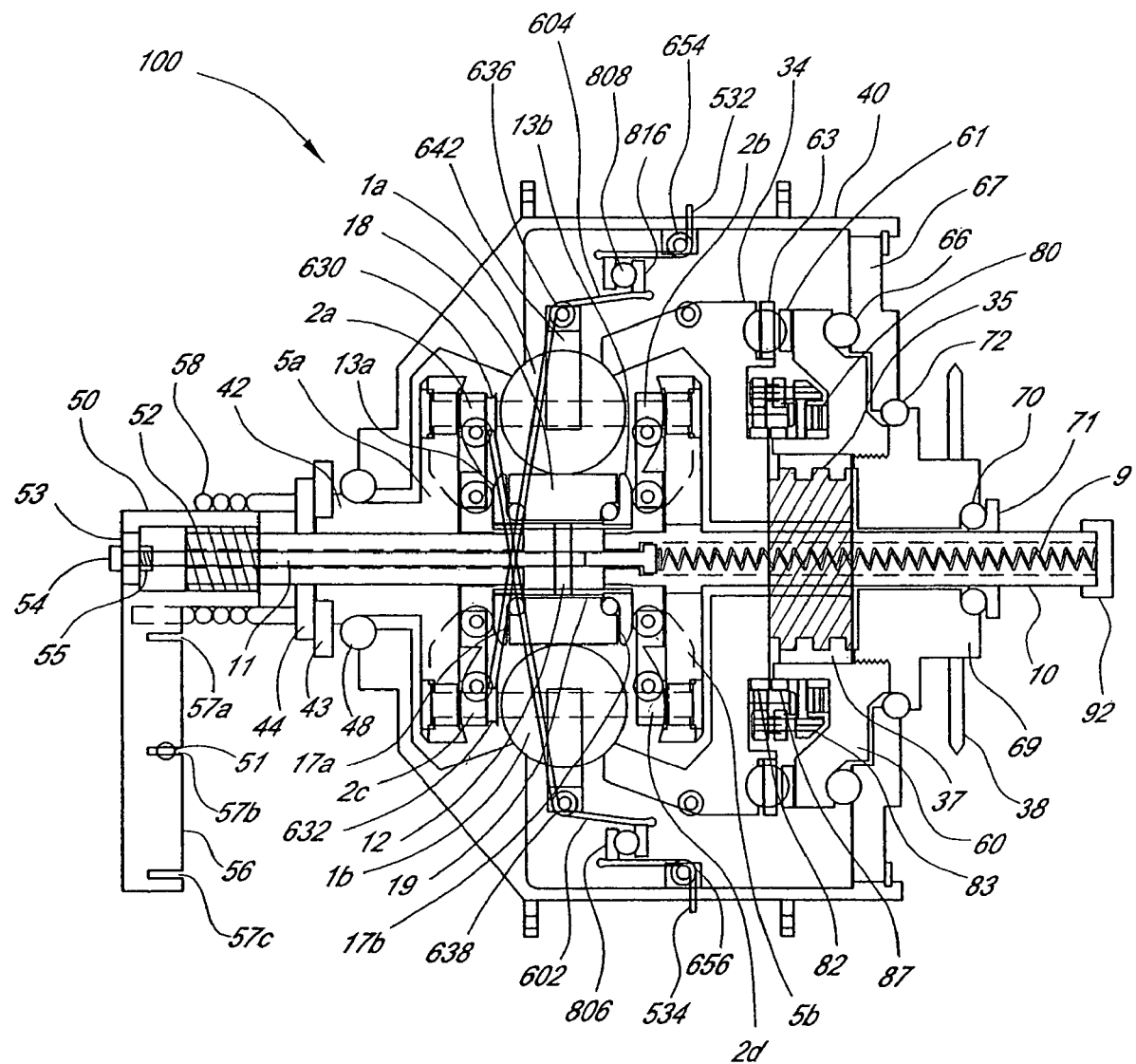
FIG. 1 is a cutaway side view of the transmission of the present invention.
Figure 2:
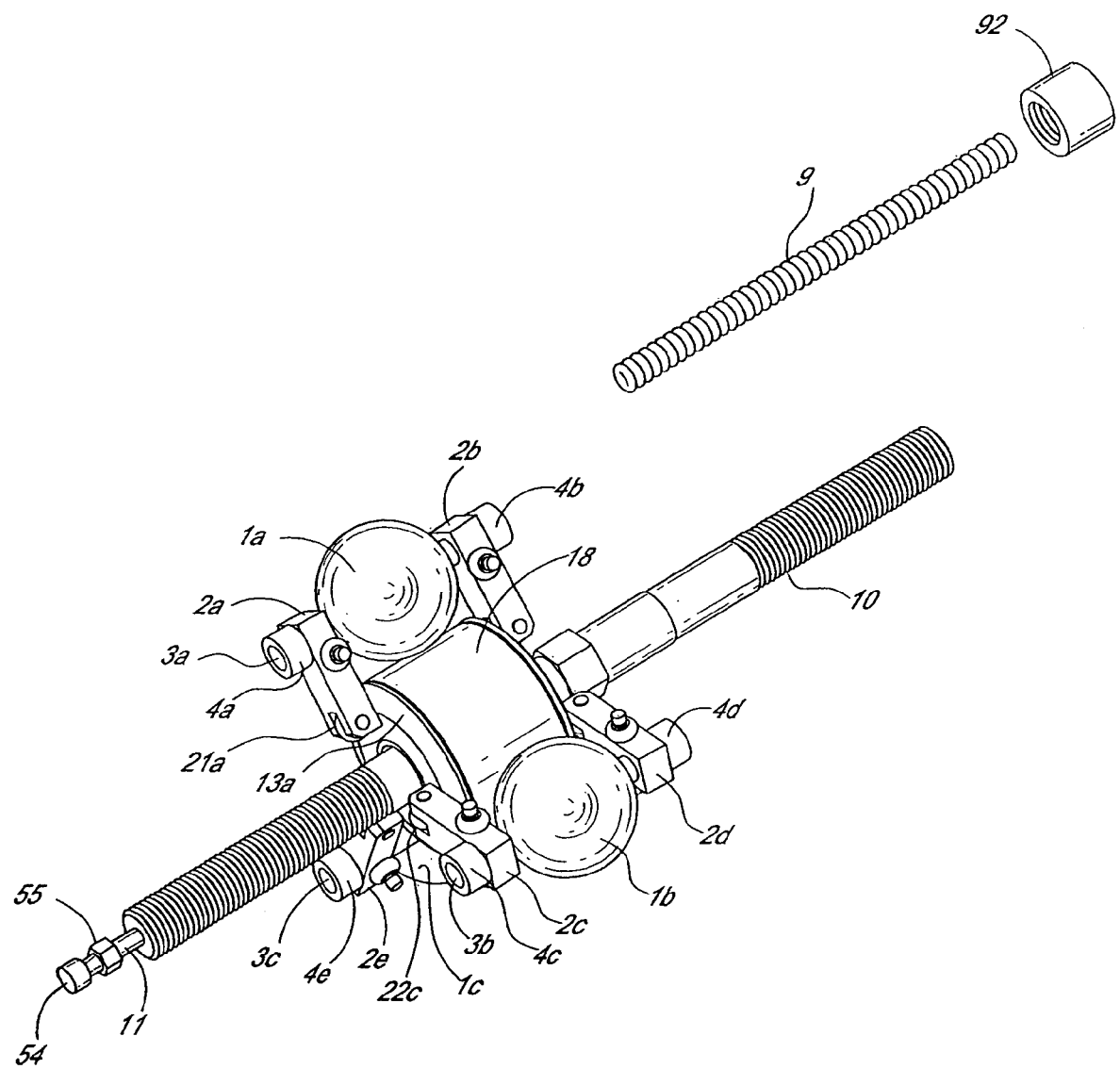
FIG. 2 is a partial perspective view of the transmission of FIG. 1.

Referring to FIGS. 1 and 2, a continuously variable transmission 100 is disclosed. The transmission 100 is shrouded in a hub shell 40 covered by a hub cap 67. At the heart of the transmission 100 are three or more power adjusters 1a, 1b, 1c which are spherical in shape and are circumferentially spaced equally around the centerline or axis of rotation of the transmission 100. As seen more clearly in FIG. 2, spindles 3a, 3b, 3c are inserted through the center of the power adjusters 1a, 1b, 1c to define an axis of rotation for the power adjusters 1a, 1b, 1c. In FIG. 1, the power adjuster's axis of rotation is shown in the horizontal direction. Spindle supports 2a–f are attached perpendicular to and at the exposed ends of the spindles 3a, 3b, 3c. In one embodiment, each of the spindles supports have a bore to receive one end of one of the spindles 3a, 3b, 3c. The spindles 3a, 3b, 3c also have spindle rollers 4a–f coaxially and slidingly positioned over the exposed ends of the spindles 3a, 3b, 3c outside of the spindle supports 2a–f.

Figure 3:
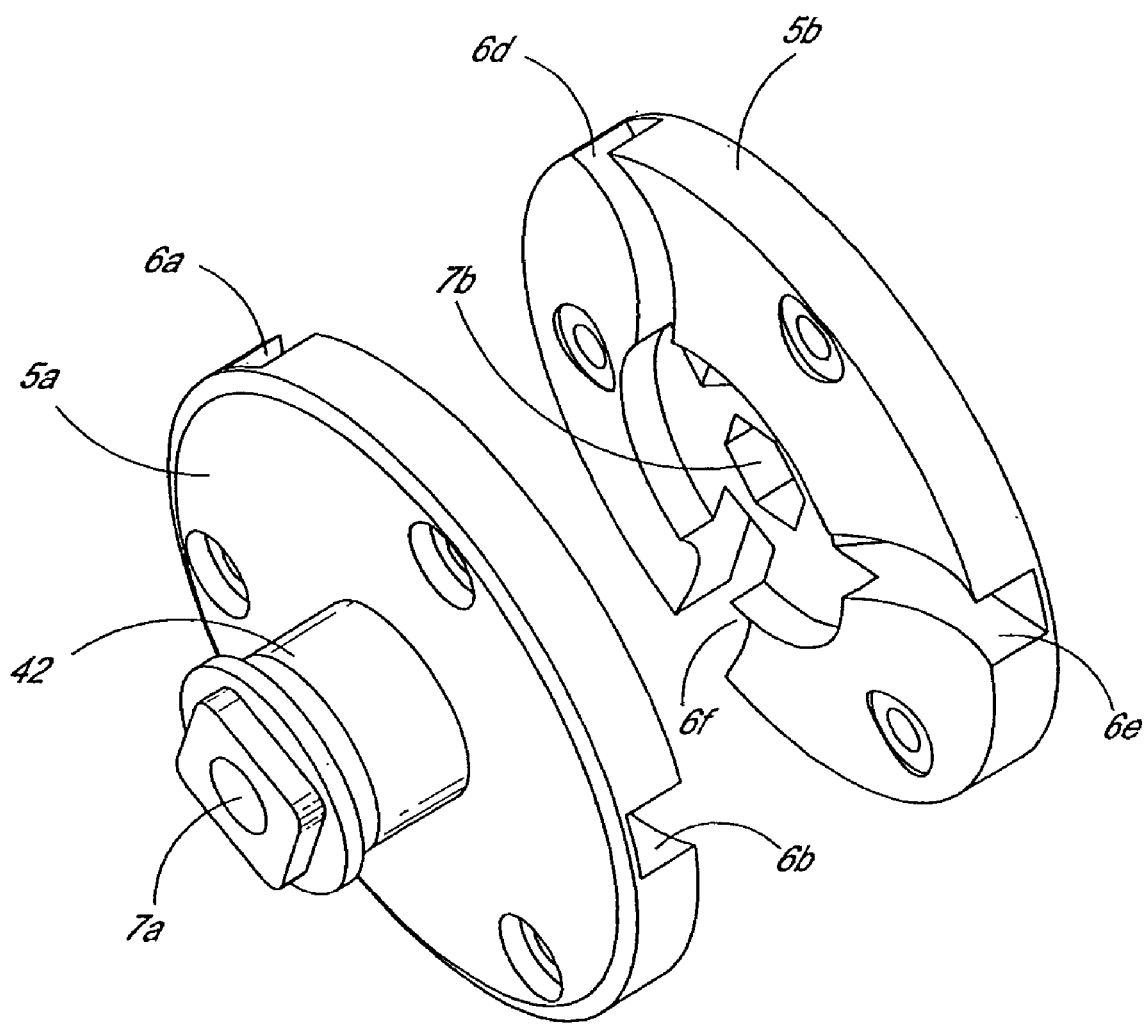
FIG. 3 is a perspective view of two stationary supports of the transmission of FIG. 1.

As the rotational axis of the power adjusters 1a, 1b, 1c is changed by tilting the spindles 3a, 3b, 3c, each spindle roller 4a–f follows in a groove 6a–f cut into a stationary support 5a, 5b. Referring to FIGS. 1 and 3, the stationary supports 5a, 5b are generally in the form of parallel discs with an axis of rotation along the centerline of the transmission 100. The grooves 6a–f extend from the outer circumference of the stationary supports 5a, 5b towards the centerline of the transmission 100. While the sides of the grooves 6a–f are substantially parallel, the bottom surface of the grooves 6a–f forms a decreasing radius as it runs towards the centerline of the transmission 100. As the transmission 100 is shifted to a lower or higher gear by changing the rotational axes of the power adjusters 1a, 1b, 1c, each pair of spindle rollers 4a–f, located on a single spindle 3a, 3b, 3c, moves in opposite directions along their corresponding grooves 6a–f.

Figure 4:
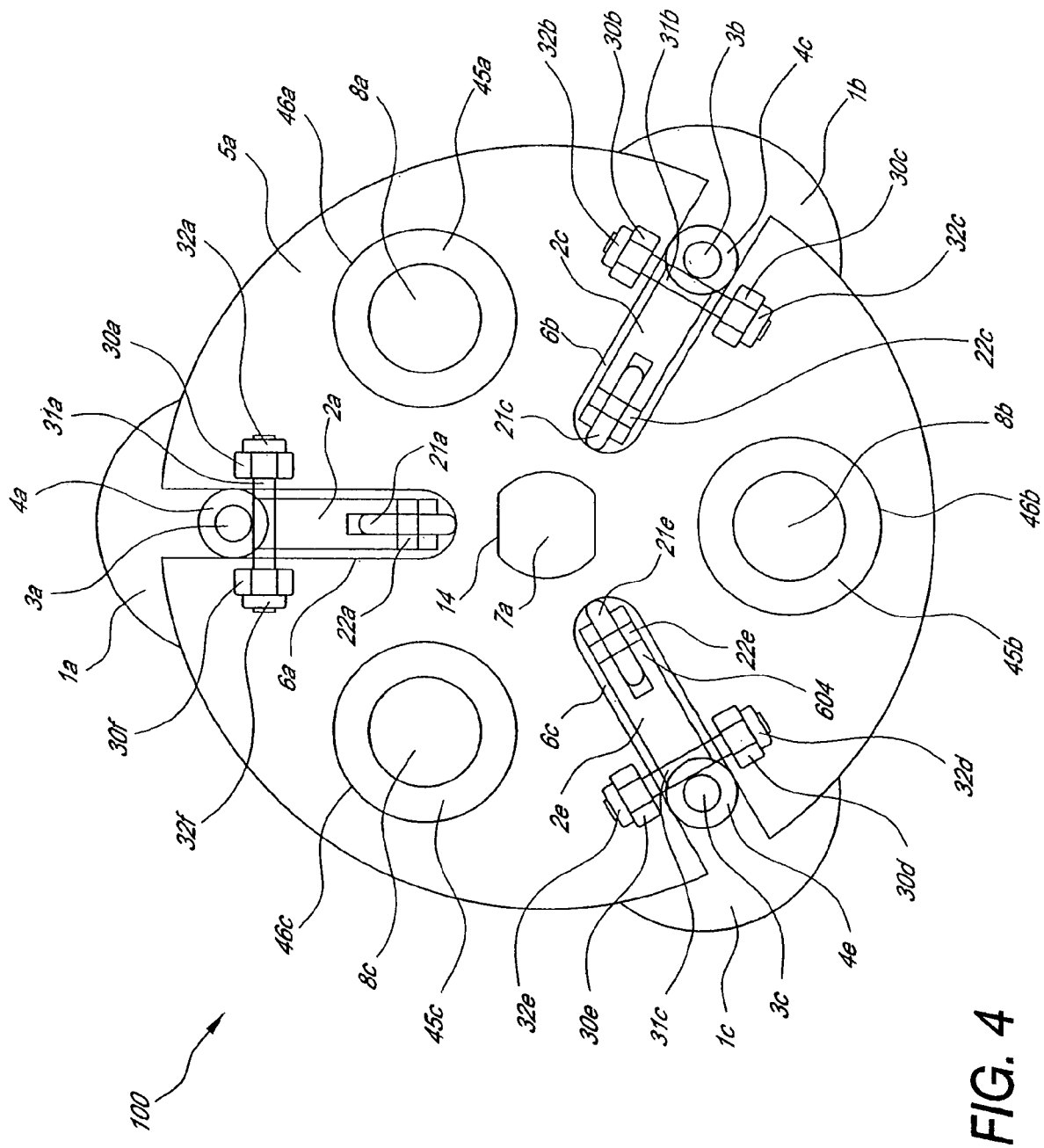
FIG. 4 is a partial end, cross-sectional view of the transmission of FIG. 1.

Referring to FIGS. 1 and 3, a centerline hole 7a, 7b in the stationary supports 5a, 5b allows the insertion of a hollow shaft 10 through both stationary supports 5a, 5b. Referring to FIG. 4, in an embodiment of the invention, one or more of the stationary support holes 7a, 7b may have a non-cylindrical shape 14, which fits over a corresponding non-cylindrical shape 15 along the hollow shaft 10 to prevent any relative rotation between the stationary supports 5a, 5b and the hollow shaft 10. If the rigidity of the stationary supports 5a, 5b is insufficient, additional structure may be used to minimize any relative rotational movement or flexing of the stationary supports 5a, 5b. This type of movement by the stationary supports 5a, 5b may cause binding of the spindle rollers 4a–f as they move along the grooves 6a–f.

Figure 7:
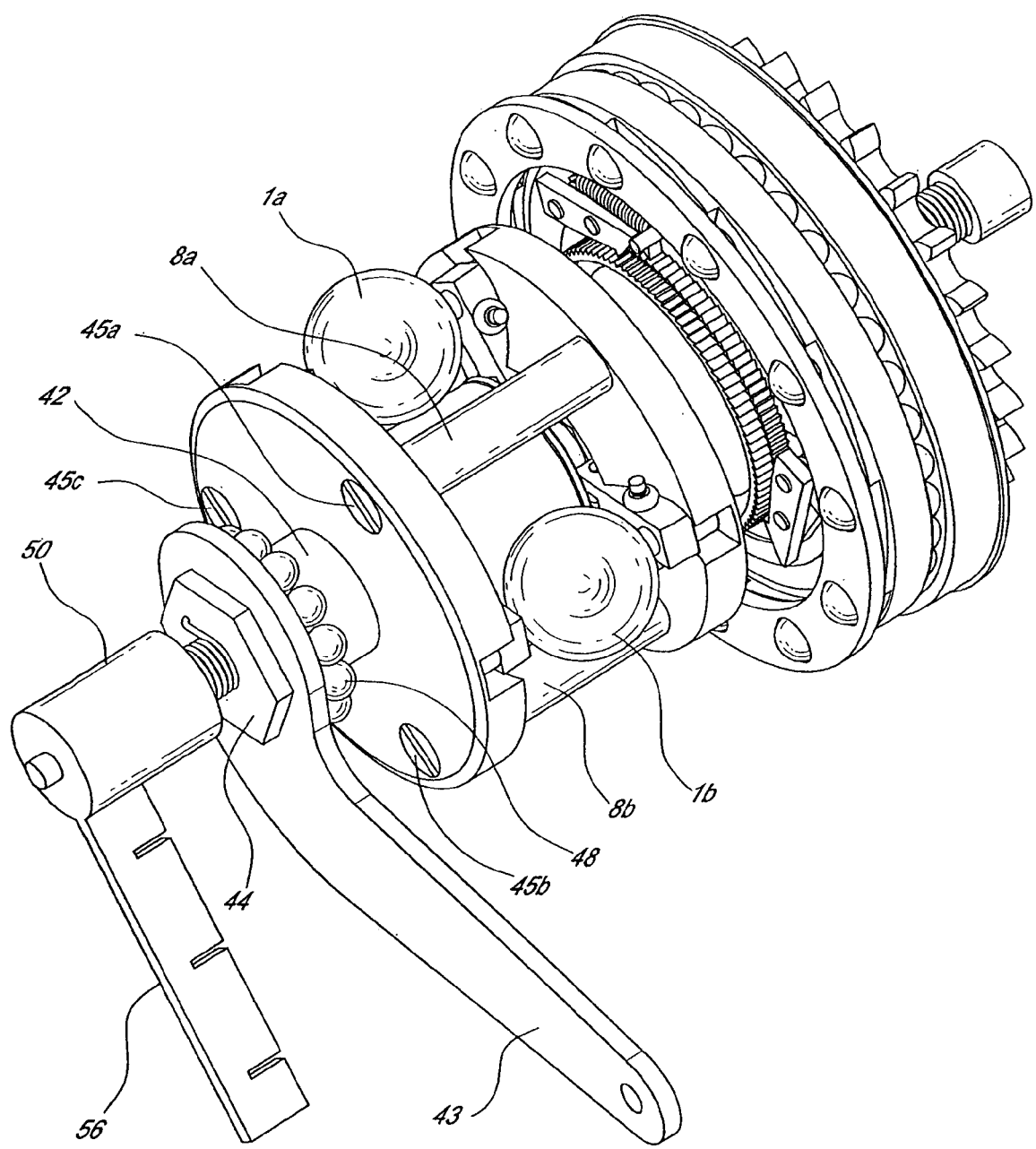
FIG. 7 is partial perspective view of the transmission of FIG. 1, wherein, among other things, a rotatable drive disc has been removed.
Figure 8:
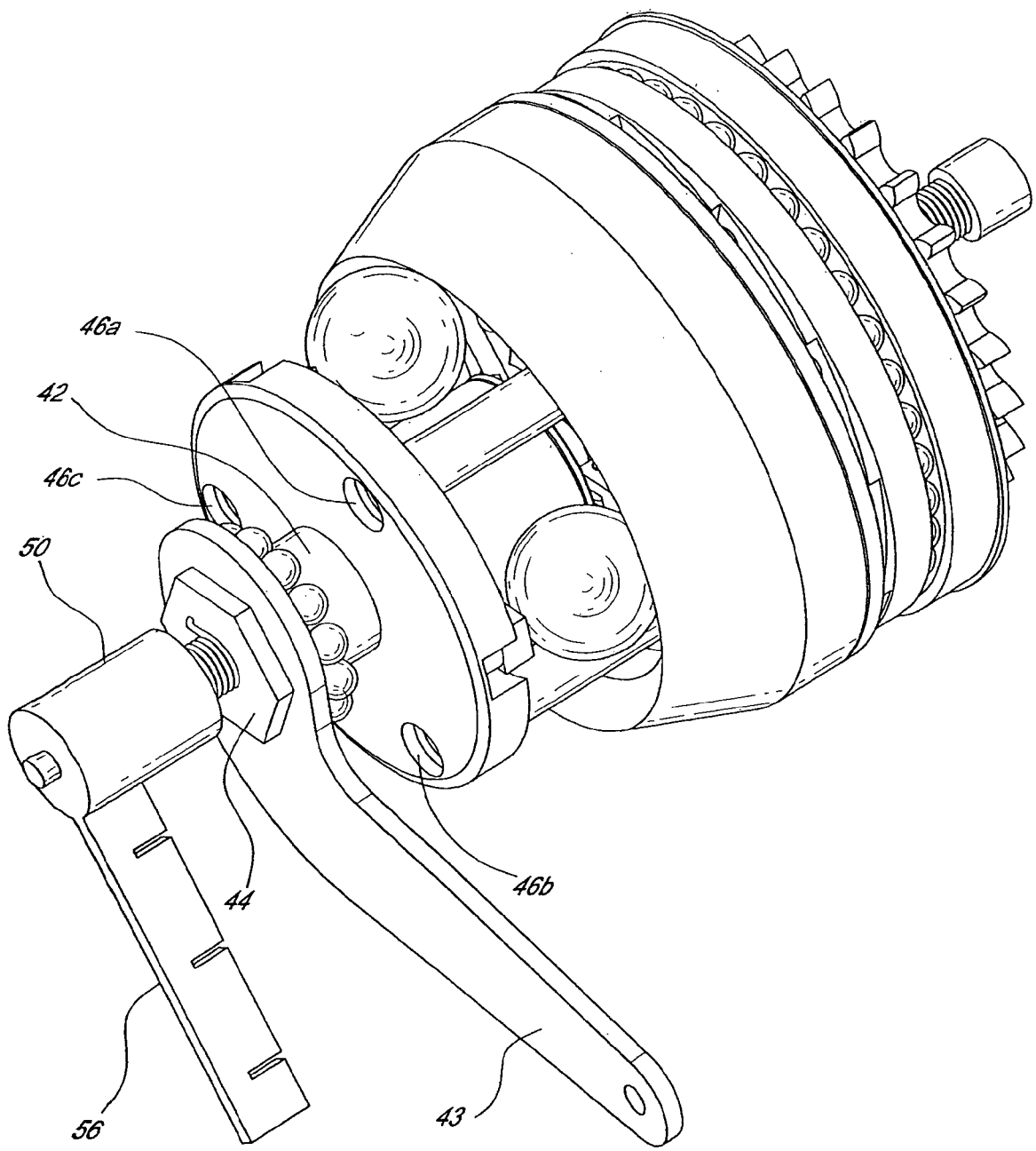
FIG. 8 is a partial perspective view of the transmission of FIG. 1, wherein, among other things, the hub shell has been removed.
Figure 9:
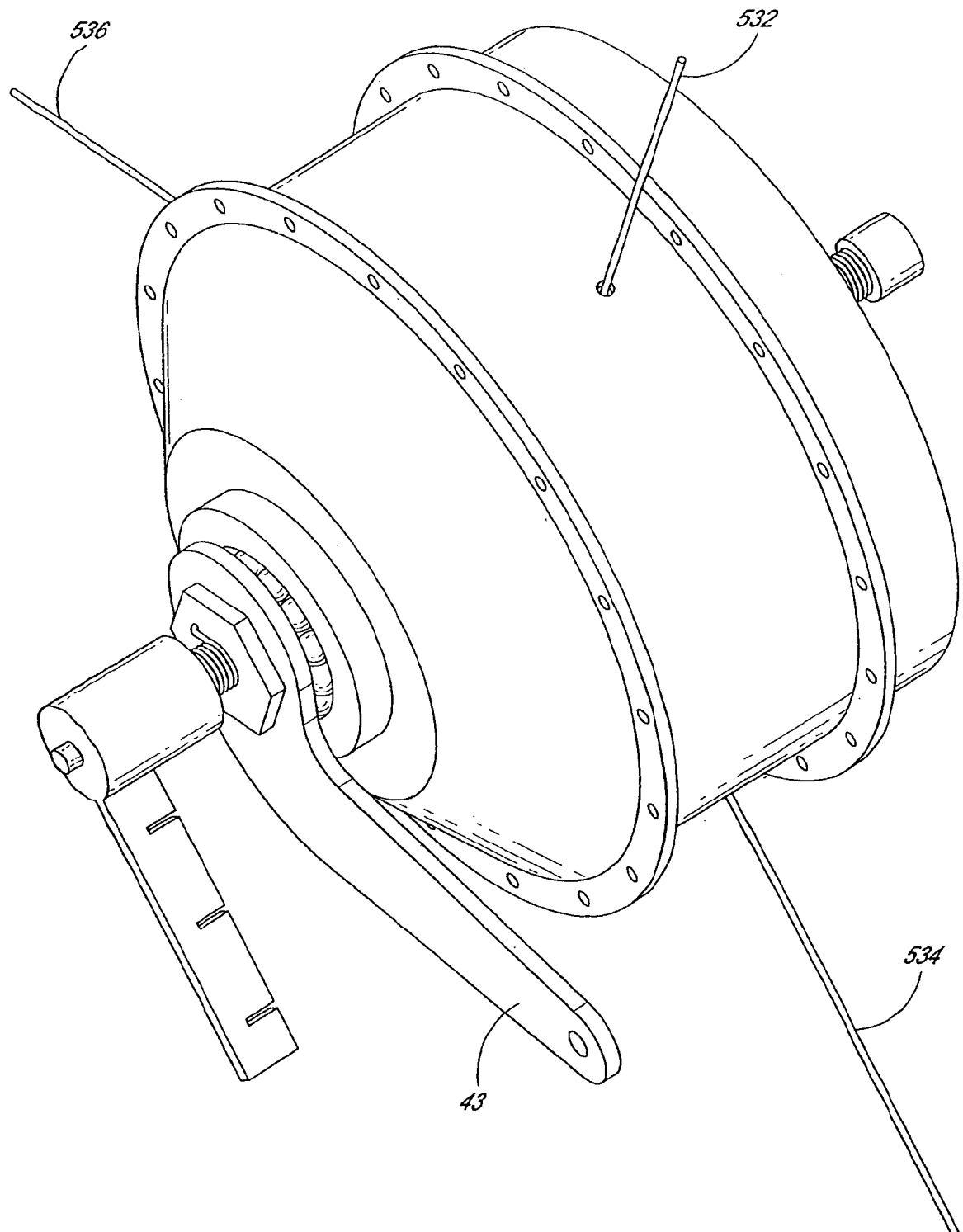
FIG. 9 is a partial perspective view of the transmission of FIG. 1, wherein the shifting is done automatically.

As shown in FIGS. 4 and 7, the additional structure may take the form of spacers 8a, 8b, 8c attached between the stationary supports 5a, 5b. The spacers 8a, 8b, 8c add rigidity between the stationary supports 5a, 5b and, in one embodiment, are located near the outer circumference of the stationary supports 5a, 5b. In one embodiment, the stationary supports 5a, 5b are connected to the spacers 8a, 8b, 8c by bolts or other fastener devices 45a–f inserted through holes 46a–f in the stationary supports 5a, 5b.

Referring back to FIGS. 1 and 3, the stationary support 5a is fixedly attached to a stationary support sleeve 42, which coaxially encloses the hollow shaft 10 and extends through the wall of the hub shell 40. The end of the stationary support sleeve 42 that extends through the hub shell 40 attaches to the frame support and preferentially has a non-cylindrical shape to enhance subsequent attachment of a torque lever 43. As shown more clearly in FIG. 7, the torque lever 43 is placed over the non-cylindrical shaped end of the stationary support sleeve 42, and is held in place by a torque nut 44. The torque lever 43 at its other end is rigidly attached to a strong, non-moving part, such as a frame (not shown). A stationary support bearing 48 supports the hub shell 40 and permits the hub shell 40 to rotate relative to the stationary support sleeve 42.

Referring back to FIGS. 1 and 2, shifting is manually activated by axially sliding a rod 11 positioned in the hollow shaft 10. One or more pins 12 are inserted through one or more transverse holes in the rod 11 and further extend through one or more longitudinal slots 16 (not shown) in the hollow shaft 10. The slots 16 in the hollow shaft 10 allow for axial movement of the pin 12 and rod 11 assembly in the hollow shaft 10. As the rod 11 slides axially in the hollow shaft 10, the ends of the transverse pins 12 extend into and couple with a coaxial sleeve 19. The sleeve 19 is fixedly attached at each end to a substantially planar platform 13a, 13b forming a trough around the circumference of the sleeve 19.

As seen more clearly in FIG. 4, the planar platforms 13a, 13b each contact and push multiple wheels 21a–f. The wheels 21a–f fit into slots in the spindle supports 2a–f and are held in place by wheel axles 22a–f. The wheel axles 22a–f are supported at their ends by the spindle supports 2a–f and allow rotational movement of the wheels 21a–f.

Referring back to FIGS. 1 and 2, the substantially planar platforms 13a, 13b transition into a convex surface at their outer perimeter (farthest from the hollow shaft 10). This region allows slack to be taken up when the spindle supports 2a–f and power adjusters 1a, 1b, 1c are tilted as the transmission 100 is shifted. A cylindrical support member 18 is located in the trough formed between the planar platforms 13a, 13b and sleeve 19 and thus moves in concert with the planar platforms 13a, 13b and sleeve 19. The support member 18 rides on contact bearings 17a, 17b located at the intersection of the planar platforms 13a, 13b and sleeve 19 to allow the support member 18 to freely rotate about the axis of the transmission 100. Thus, the bearings 17a, 17b, support member 18, and sleeve 19 all slide axially with the planar platforms 13a, 13b when the transmission 100 is shifted.

Now referring to FIGS. 3 and 4, stationary support rollers 30a–l are attached in pairs to each spindle leg 2a–f through a roller pin 31a–f and held in place by roller clips 32a–l. The roller pins 31a–f allow the stationary support rollers 30a–l to rotate freely about the roller pins 31a–f. The stationary support rollers 30a–l roll on a concave radius in the stationary support 5a, 5b along a substantially parallel path with the grooves 6a–f. As the spindle rollers 4a–f move back and forth inside the grooves 6a–f, the stationary support rollers 30a–l do not allow the ends of the spindles 3a, 3b, 3c nor the spindle rollers 4a–f to contact the bottom surface of the grooves 6a–f, to maintain the position of the spindles 3a, 3b, 3c, and to minimize any frictional losses.

FIG. 4 shows the stationary support rollers 30a–l, the roller pins, 31a–f, and roller clips 32a–l, as seen through the stationary support 5a, for ease of viewing. For clarity, i.e., too many numbers in FIG. 1, the stationary support rollers 30a–l, the roller pins, 31a–f, and roller clips 32a–l, are not numbered in FIG. 1.

Figure 5:
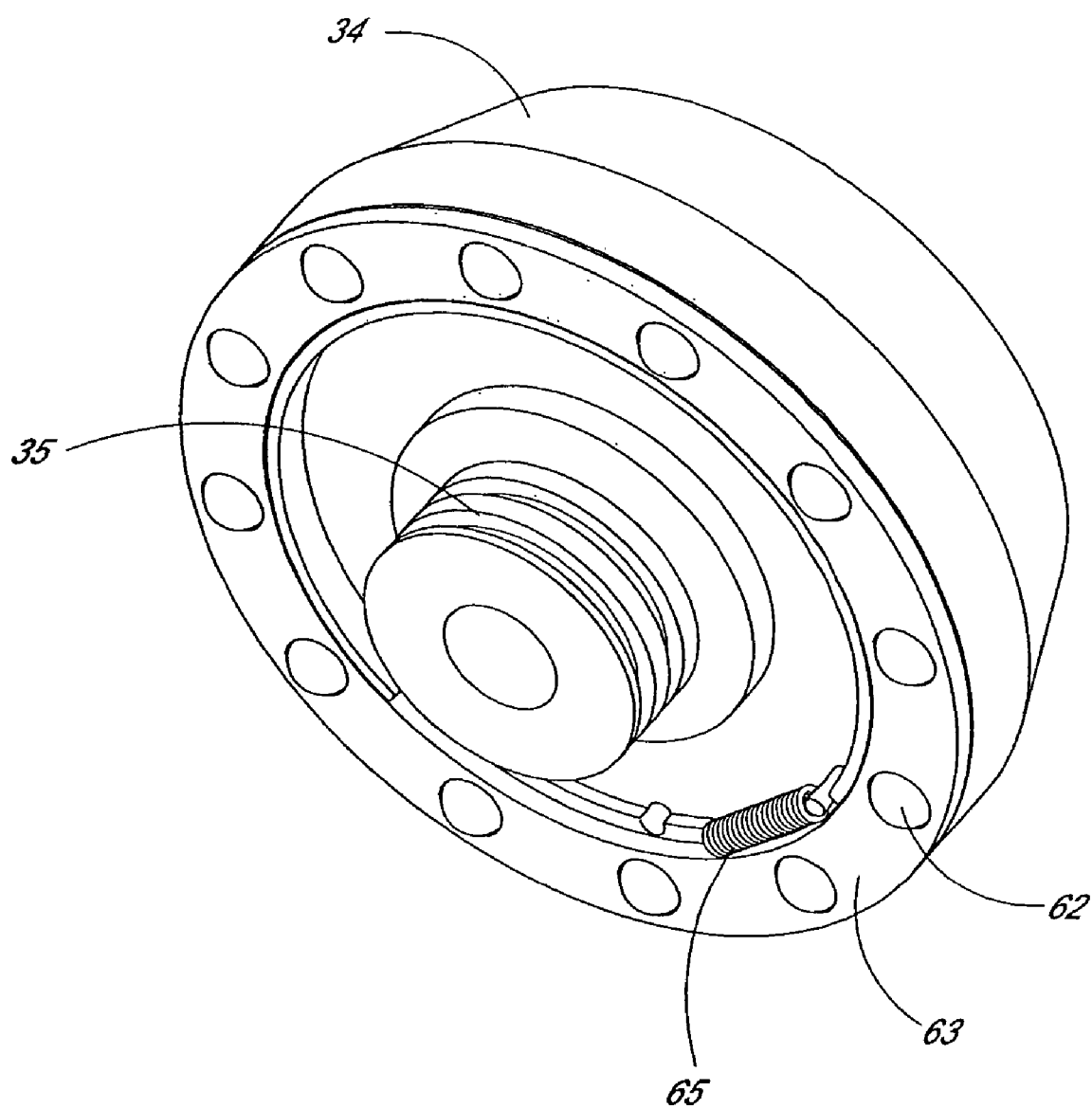
FIG. 5 is a perspective view of a drive disc, bearing cage, screw, and ramp bearings of the transmission of FIG. 1.

Referring to FIGS. 1 and 5, a concave drive disc 34, located adjacent to the stationary support 5b, partially encapsulates but does not contact the stationary support 5b. The drive disc 34 is rigidly attached through its center to a screw 35. The screw 35 is coaxial to and forms a sleeve around the hollow shaft 10 adjacent to the stationary support 5b and faces a driving member 69. The drive disc 34 is rotatively coupled to the power adjusters 1a, 1b, 1c along a circumferential bearing surface on the lip of the drive disc 34. A nut 37 is threaded over the screw 35 and is rigidly attached around its circumference to a bearing disc 60. One face of the nut 37 is further attached to the driving member 69. Also rigidly attached to the bearing disc 60 surface are a plurality of ramps 61 which face the drive disc 34. For each ramp 61 there is one ramp bearing 62 held in position by a bearing cage 63. The ramp bearings 62 contact both the ramps 61 and the drive disc 34. A spring 65 is attached at one end to the bearing cage 63 and at its other end to the drive disc 34, or the bearing disc 60 in an alternate embodiment, to bias the ramp bearings 62 up the ramps 61. The bearing disc 60, on the side opposite the ramps 61 and at approximately the same circumference contacts a hub cap bearing 66. The hub cap bearing 66 contacts both the hub cap 67 and the bearing disc 60 to allow their relative motion. The hub cap 67 is threaded or pressed into the hub shell 40 and secured with an internal ring 68. A sprocket or pulley 38 is rigidly attached to the rotating driving member 69 and is held in place externally by a cone bearing 70 secured by a cone nut 71 and internally by a driver bearing 72 which contacts both the driving member 69 and the hub cap 67.

In operation, an input rotation from the sprocket or pulley 38, which is fixedly attached to the driver 69, rotates the bearing disc 60 and the plurality of ramps 61 causing the ramp bearings 62 to roll up the ramps 61 and press the drive disc 34 against the power adjusters 1a, 1b, 1c. Simultaneously, the nut 37, which has a smaller lead than the ramps 61, rotates to cause the screw 35 and nut 37 to bind. This feature imparts rotation of the drive disc 34 against the power adjusters 1a, 1b, 1c. The power adjusters 1a, 1b, 1c, when rotating, contact and rotate the hub shell 40.

When the transmission 100 is coasting, the sprocket or pulley 38 stops rotating but the hub shell 40 and the power adjusters 1a, 1b, 1c, continue to rotate. This causes the drive disc 34 to rotate so that the screw 35 winds into the nut 37 until the drive disc 34 no longer contacts the power adjusters 1a, 1b, 1c.

Figure 6:
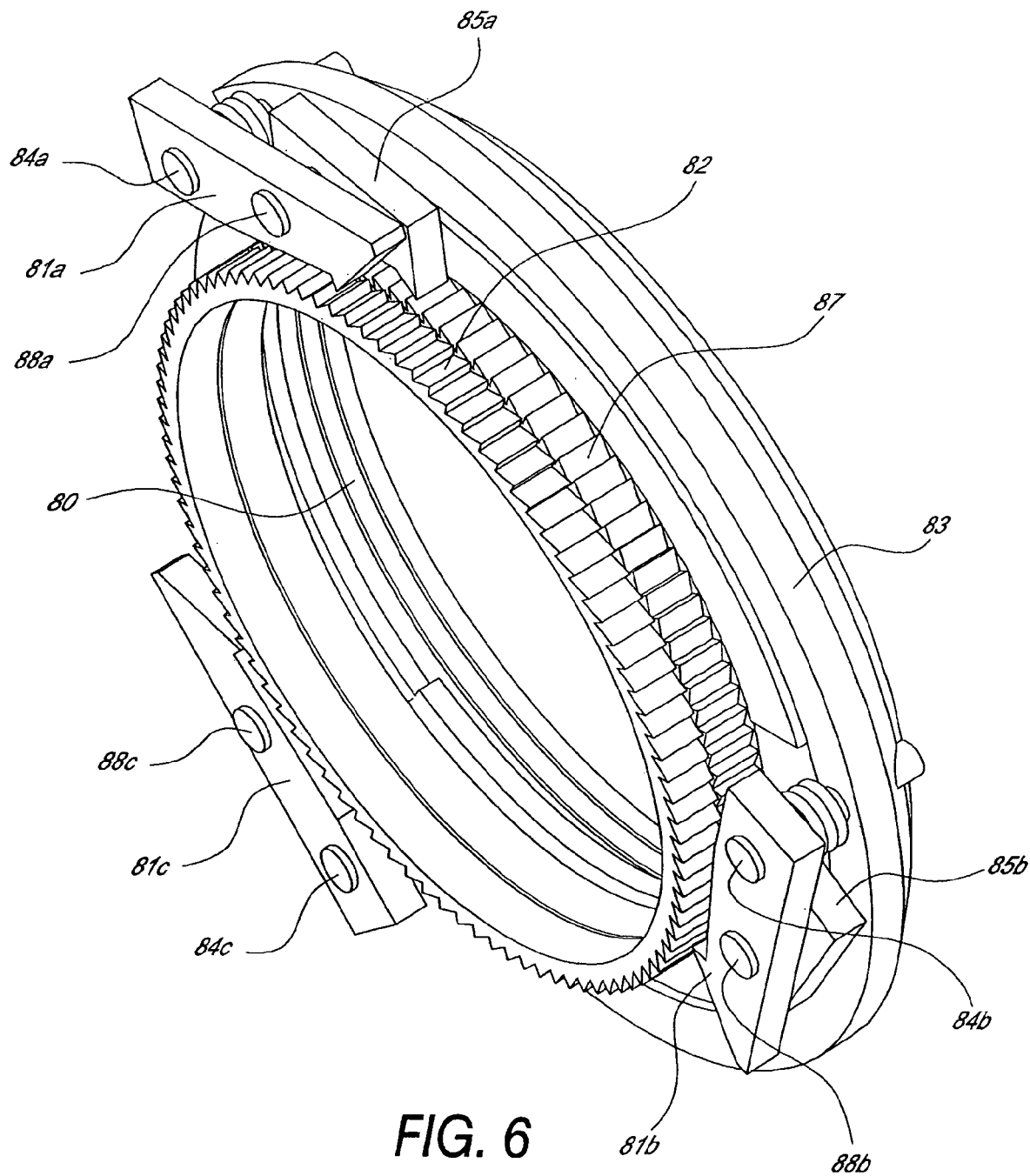
FIG. 6 is a perspective view of a ratchet and pawl subsystem of the transmission of FIG. 1 that is used to engage and disengage the transmission.

Referring to FIGS. 1, 6, and 7, a coiled spring 80, coaxial with the transmission 100, is located between and attached by pins or other fasteners (not shown) to both the bearing disc 60 and drive disc 34 at the ends of the coiled spring 80. During operation of the transmission 100, the coiled spring 80 ensures contact between the power adjusters 1a, 1b, 1c and the drive disc 34. A pawl carrier 83 fits in the coiled spring 80 with its middle coil attached to the pawl carrier 83 by a pin or standard fastener (not shown). Because the pawl carrier 83 is attached to the middle coil of the coiled spring 80, it rotates at half the speed of the drive disc 34 when the bearing disc 60 is not rotating. This allows one or more lock pawls 81a, 81b, 81c, which are attached to the pawl carrier 83 by one or more pins 84a, 84b, 84c, to engage a drive disc ratchet 82, which is coaxial with and rigidly attached to the drive disc 34. The one or more lock pawls 84a, 84b, 84c are preferably spaced asymmetrically around the drive disc ratchet 82. Once engaged, the loaded coiled spring 80 is prevented from forcing the drive disc 34 against the power adjusters 1a, 1b, 1c. Thus, with the drive disc 34 not making contact against the power adjusters 1a, 1b, 1c, the transmission 100 is in neutral and the ease of shifting is increased.

The transmission 100 can also be shifted while in operation.

When operation of the transmission 100 is resumed by turning the sprocket or pulley 38, one or more release pawls 85a, 85b, 85c, each attached to one of the lock pawls 81a, 81b, 81c by a pawl pin 88a, 88b, 88c, make contact with an opposing bearing disc ratchet 87. The bearing disc ratchet 87 is coaxial with and rigidly attached to the bearing disc 60. The bearing disc ratchet 87 actuates the release pawls 85a, 85b, 85c because the release pawls 85a, 85b, 85c are connected to the pawl carrier 83 via the lock pawls 81a, 81b, 81c. In operation, the release pawls 85a, 85b, 85c rotate at half the speed of the bearing disc 60, since the drive disc 34 is not rotating, and disengage the lock pawls 81a, 81b, 81c from the drive disc ratchet 82 allowing the coiled spring 80 to wind the drive disc 34 against the power adjusters 1a, 1b, 1c. One or more pawl tensioners (not shown), one for each release pawl 85a, 85b, 85c, ensures that the lock pawls 81a, 81b, 81c are pressed against the drive disc ratchet 82 and that the release pawls 85a, 85b, 85c are pressed against the bearing disc ratchet 87. The pawl tensioners are attached at one end to the pawl carrier 83 and make contact at the other end to the release pawls 85a, 85b, 85c. An assembly hole 93 (not shown) through the hub cap 67, the bearing disc 60, and the drive disc 34, allows an assembly pin (not shown) to be inserted into the loaded coiled spring 80 during assembly of the transmission 100. The assembly pin prevents the coiled spring 80 from losing its tension and is removed after transmission 100 assembly is complete.

Referring to FIGS. 1, 11, 12, and 15, automatic shifting of the transmission 100, is accomplished by means of spindle cables 602, 604, 606 which are attached at one end to a non-moving component of the transmission 100, such as the hollow shaft 10 or the stationary support 5a. The spindle cables 602, 604, 606 then travel around spindle pulleys 630, 632, 634, which are coaxially positioned over the spindles 3a, 3b, 3c. The spindle cables 602, 604, 606 further travel around spacer pulleys 636, 638, 640, 644, 646, 648 which are attached to a spacer extension 642 which may be rigidly attached to the spacers 8a, 8b, 8c. As more clearly shown in FIGS. 11 and 12, the other ends of the spindle cables 602, 604, 606 are attached to a plurality of holes 620, 622, 624 in a non-rotating annular bearing race 816. A plurality of weight cables 532, 534, 536 are attached at one end to a plurality of holes 610, 612, 614 in a rotating annular bearing race 806. An annular bearing 808, positioned between the rotating annular bearing race 806 and the non-rotating annular bearing race 816, allows their relative movement.

Figure 15:
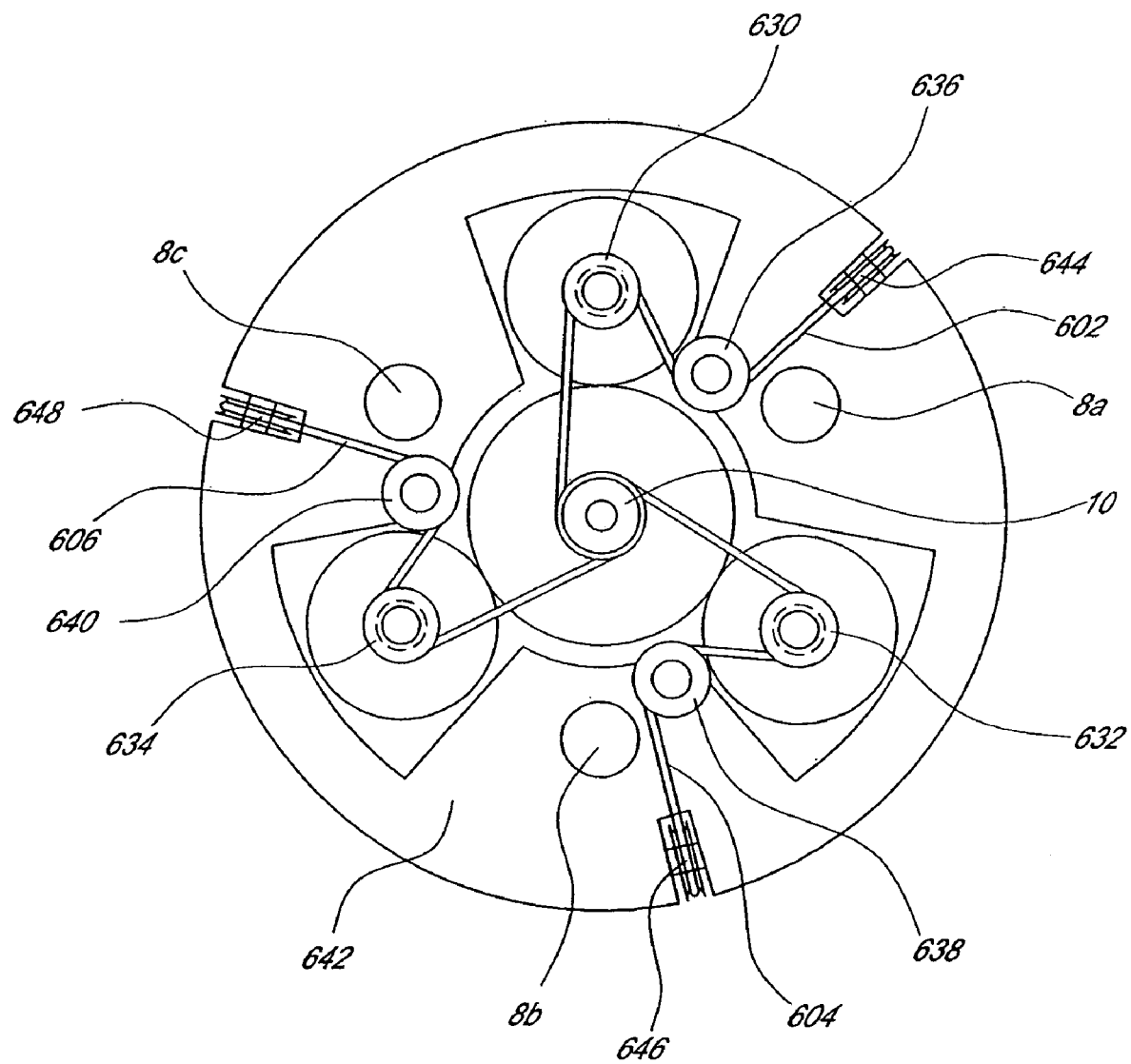
FIG. 15 is a schematic end view of the transmission in FIG. 1 showing the cable routing across a spacer extension of the automatic portion of the transmission.

Referring to FIG. 15, the transmission 100 is shown with the cable routing for automatic shifting.

As shown in FIGS. 1, 9, 11, and 12, the weight cables 532, 534, 536 then travel around the hub shell pulleys 654, 656, 658, through holes in the hub shell 40, and into hollow spokes 504, 506, 508 (best seen in FIG. 12) where they attach to weights 526, 528, 530. The weights 526, 528, 530 are attached to and receive support from weight assisters 516, 518, 520 which attach to a wheel 514 or other rotating object at there opposite end. As the wheel 514 increases its speed of rotation, the weights 526, 528, 530 are pulled radially away from the hub shell 40, pulling the rotating annular bearing race 806 and the non-rotating annular bearing race 816 axially toward the hub cap 67. The non-rotating annular bearing race 816 pulls the spindle cables 602, 604, 606, which pulls the spindle pulleys 630, 632, 634 closer to the hollow shaft 10 and results in the shifting of the transmission 100 into a higher gear. When rotation of the wheel 514 slows, one or more tension members 9 positioned inside the hollow shaft 10 and held in place by a shaft cap 92, push the spindle pulleys 630, 632, 634 farther from the hollow shaft 10 and results in the shifting of the transmission 100 into a lower gear.

Alternatively, or in conjunction with the tension member 9, multiple tension members (not shown) may be attached to the spindles 3a, 3b, 3c opposite the spindle pulleys 630, 632, 634.

Still referring to FIG. 1, the transmission 100 can also be manually shifted to override the automatic shifting mechanism or to use in place of the automatic shifting mechanism. A rotatable shifter 50 has internal threads that thread onto external threads of a shifter screw 52 which is attached over the hollow shaft 10. The shifter 50 has a cap 53 with a hole that fits over the rod 11 that is inserted into the hollow shaft 10. The rod 11 is threaded where it protrudes from the hollow shaft 10 so that nuts 54, 55 may be threaded onto the rod 11. The nuts 54, 55 are positioned on both sides of the cap 53. A shifter lever 56 is rigidly attached to the shifter 50 and provides a moment arm for the rod 11. The shifter cable 51 is attached to the shifter lever 56 through lever slots 57a, 57b, 57c. The multiple lever slots 57a, 57b, 57c provide for variations in speed and ease of shifting.

Figure 10:
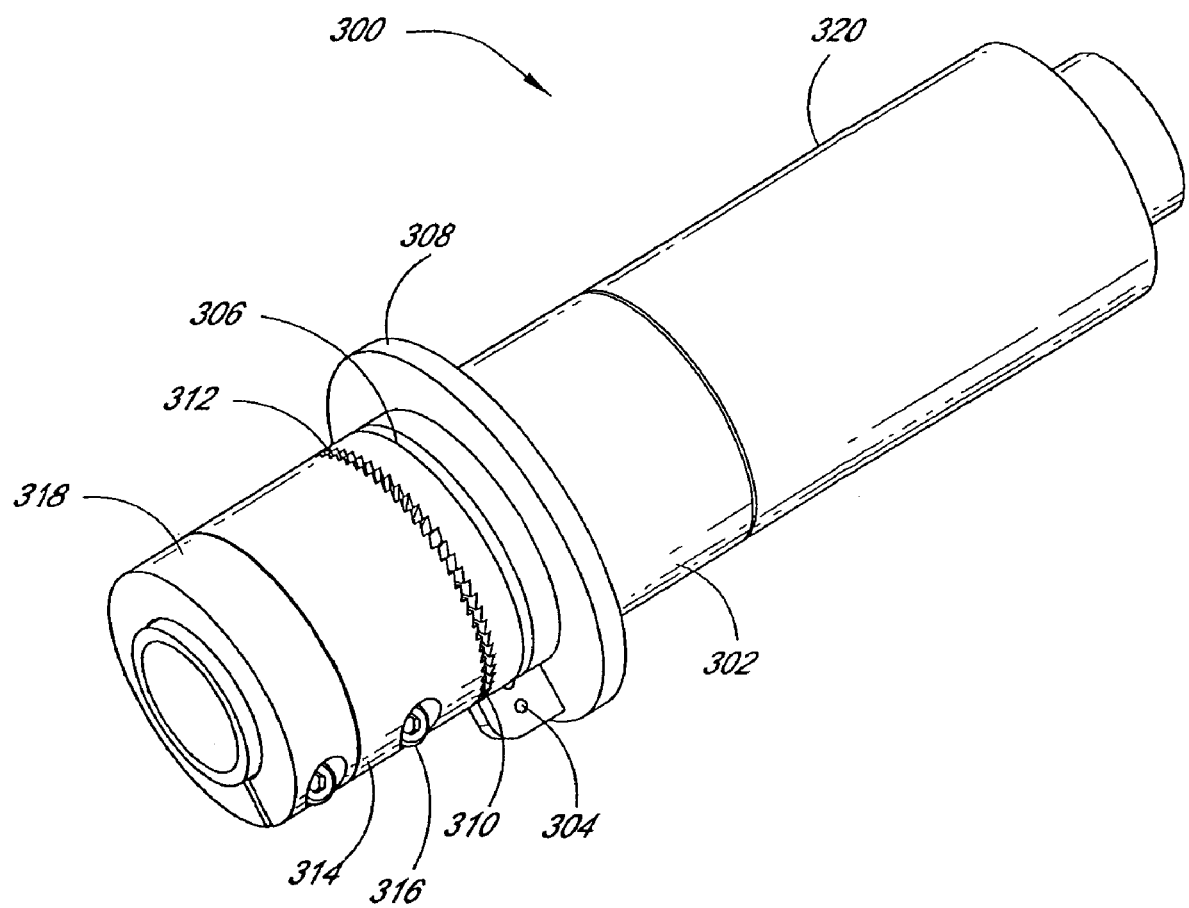
FIG. 10 is a perspective view of the shifting handlegrip that is mechanically coupled to the transmission of FIG. 1.
Figure 11:
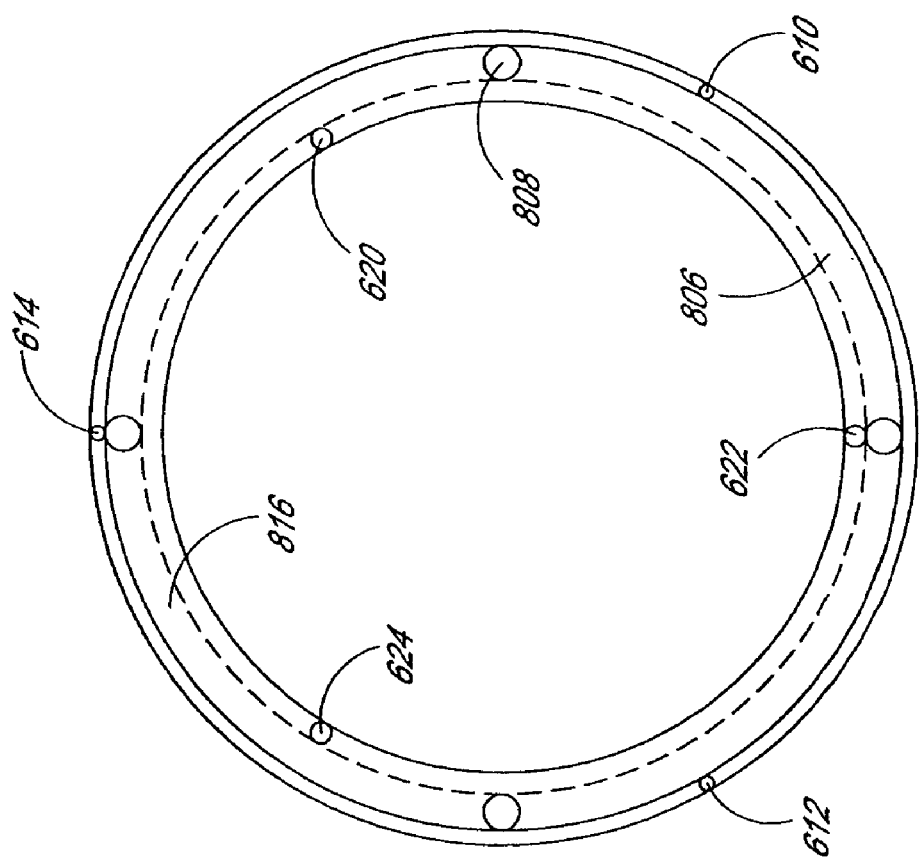
FIG. 11 is an end view of a thrust bearing, of the transmission shown in FIG. 1, which is used for automatic shifting of the transmission.
Figure 12:
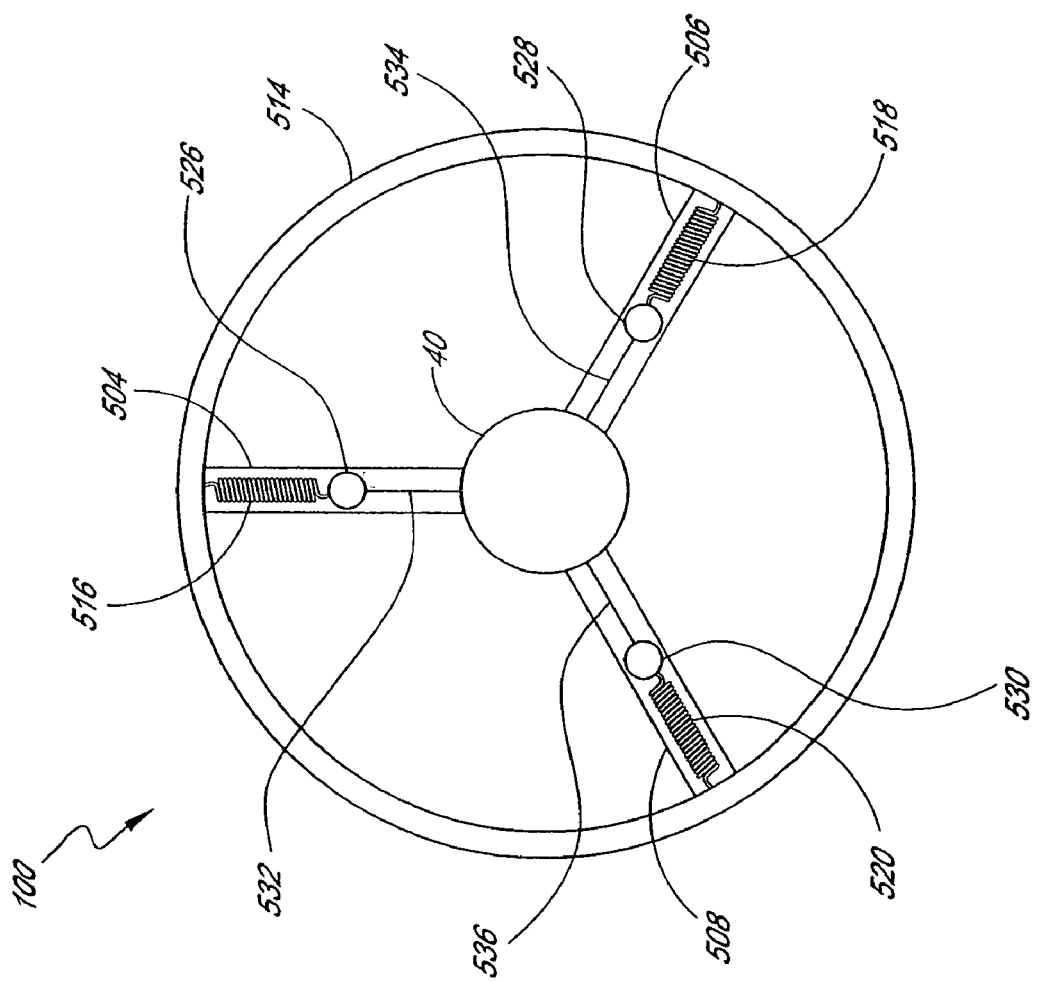
FIG. 12 is an end view of the weight design of the transmission shown in FIG. 1.

Now referring to FIGS. 1 and 10, the shifter cable 51 is routed to and coaxially wraps around a handlegrip 300. When the handlegrip 300 is rotated in a first direction, the shifter 50 winds or unwinds axially over the hollow shaft 10 and pushes or pulls the rod 11 into or out of the hollow shaft 10. When the handlegrip 300 is rotated in a second direction, a shifter spring 58, coaxially positioned over the shifter 50, returns the shifter 50 to its original position. The ends of the shifter spring 58 are attached to the shifter 50 and to a non-moving component, such as a frame (not shown).

As seen more clearly in FIG. 10, the handlegrip 300 is positioned over a handlebar (not shown) or other rigid component. The handlegrip 300 includes a rotating grip 302, which consists of a cable attachment 304 that provides for attachment of the shifter cable 51 and a groove 306 that allows the shifter cable 51 to wrap around the rotating grip 302. A flange 308 is also provided to preclude a user from interfering with the routing of the shifter cable 51. Grip ratchet teeth 310 are located on the rotating grip 302 at its interface with a rotating clamp 314. The grip ratchet teeth 310 lock onto an opposing set of clamp ratchet teeth 312 when the rotating grip 302 is rotated in a first direction. The clamp ratchet teeth 312 form a ring and are attached to the rotating clamp 314 which rotates with the rotating grip 302 when the grip ratchet teeth 310 and the clamp ratchet teeth 312 are locked. The force required to rotate the rotating clamp 314 can be adjusted with a set screw 316 or other fastener. When the rotating grip 302, is rotated in a second direction, the grip ratchet teeth 310, and the clamp ratchet teeth 312 disengage. Referring back to FIG. 1, the tension of the shifter spring 58 increases when the rotating grip 302 is rotated in the second direction. A non-rotating clamp 318 and a non-rotating grip 320 prevent excessive axial movement of the handlegrip 300 assembly.

Figure 13:
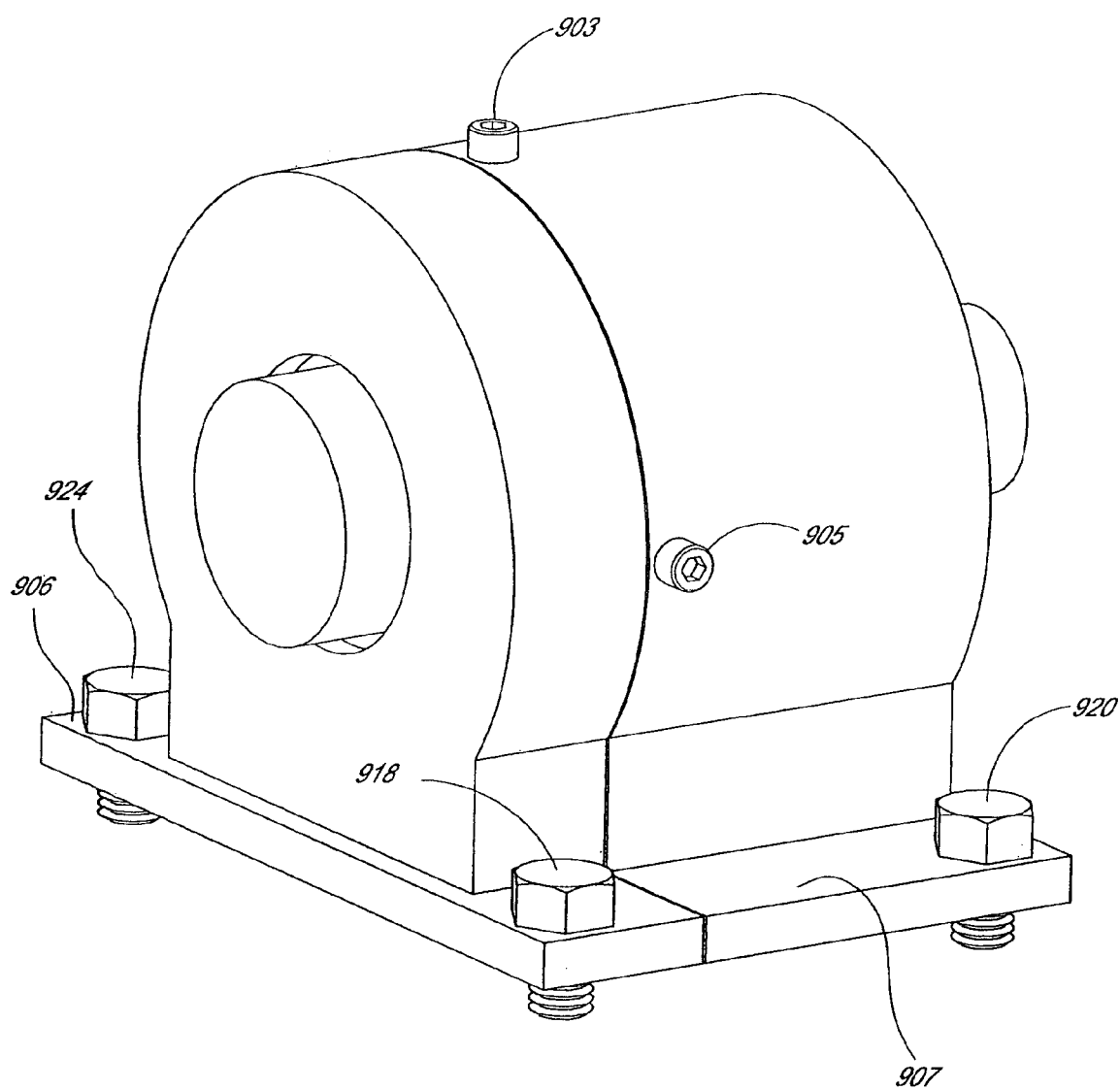
FIG. 13 is a perspective view of an alternate embodiment of the transmission bolted to a flat surface.
Figure 14:
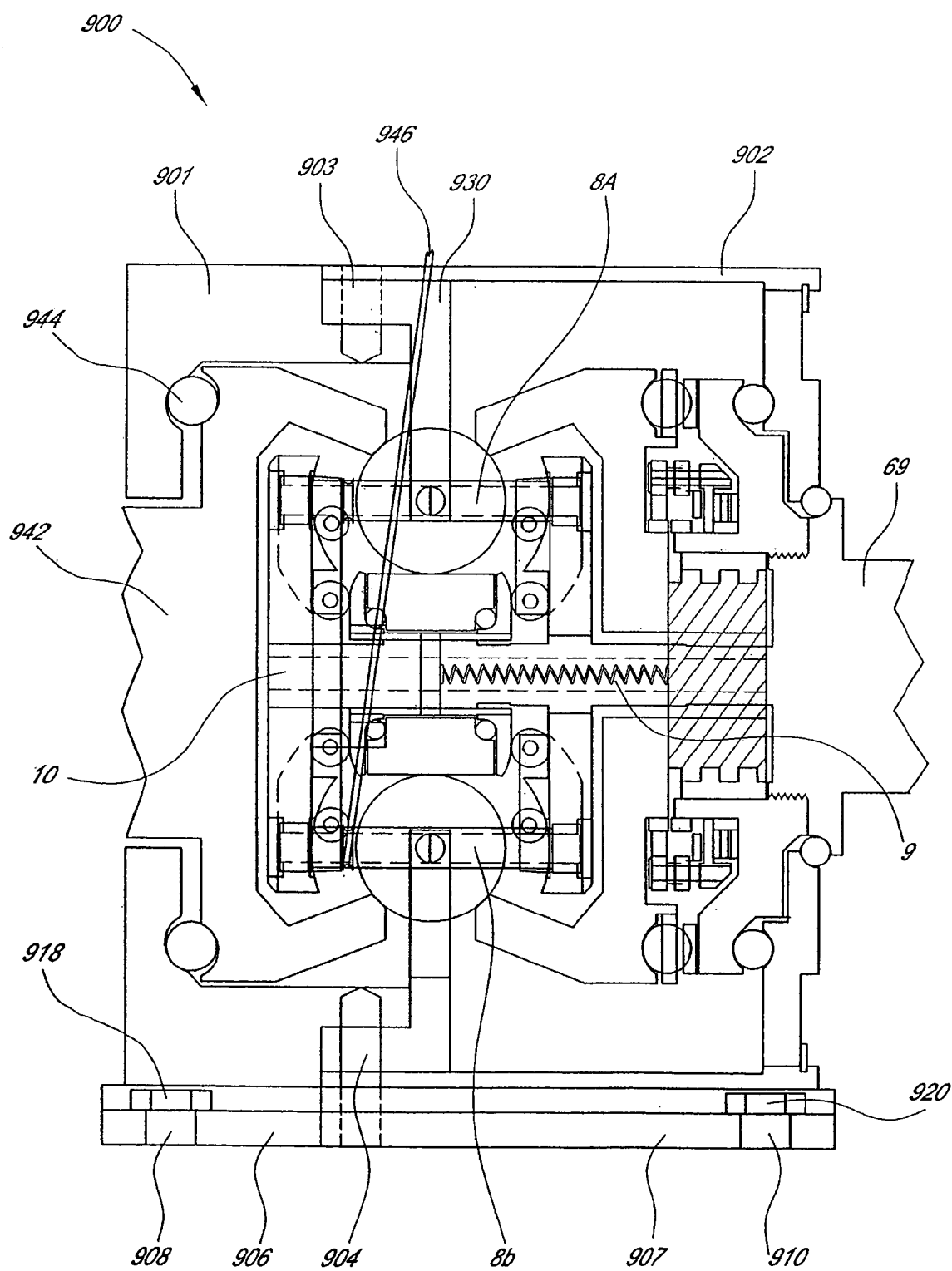
FIG. 14 is a cutaway side view of the transmission shown in FIG. 13.

Referring to FIGS. 13 and 14, another embodiment of the transmission 900, is disclosed. For purposes of simplicity, only the differences between the transmission 100 and the transmission 900 are discussed.

Replacing the rotating hub shell 40 are a stationary case 901 and housing 902, which are joined with one or more set screws 903, 904, 905. The set screws 903, 904, 905 may be removed to allow access for repairs to the transmission 900. Both the case 901 and housing 902 have coplanar flanges 906, 907 with a plurality of bolt holes 908, 910, 912, 914 for insertion of a plurality of bolts 918, 920, 922, 924 to fixedly mount the transmission 900 to a non-moving component, such as a frame (not shown).

The spacer extension 930 is compressed between the stationary case 901 and housing 902 with the set screws 903, 904, 905 and extend towards and are rigidly attached to the spacers 8a, 8b, 8c. The spacer extension 930 prevents rotation of the stationary supports 5a, 5b. The stationary support 5a does not have the stationary support sleeve 42 as in the transmission 100. The stationary supports 5a, 5b hold the hollow shaft 10 in a fixed position. The hollow shaft 10 terminates at one end at the stationary support 5a and at its other end at the screw 35. An output drive disc 942 is added and is supported against the case 901 by a case bearing 944. The output drive disc 942 is attached to an output drive component, such as a drive shaft, gear, sprocket, or pulley (not shown). Similarly, the driving member 69 is attached to the input drive component, such as a motor, gear, sprocket, or pulley.

Figure 16:
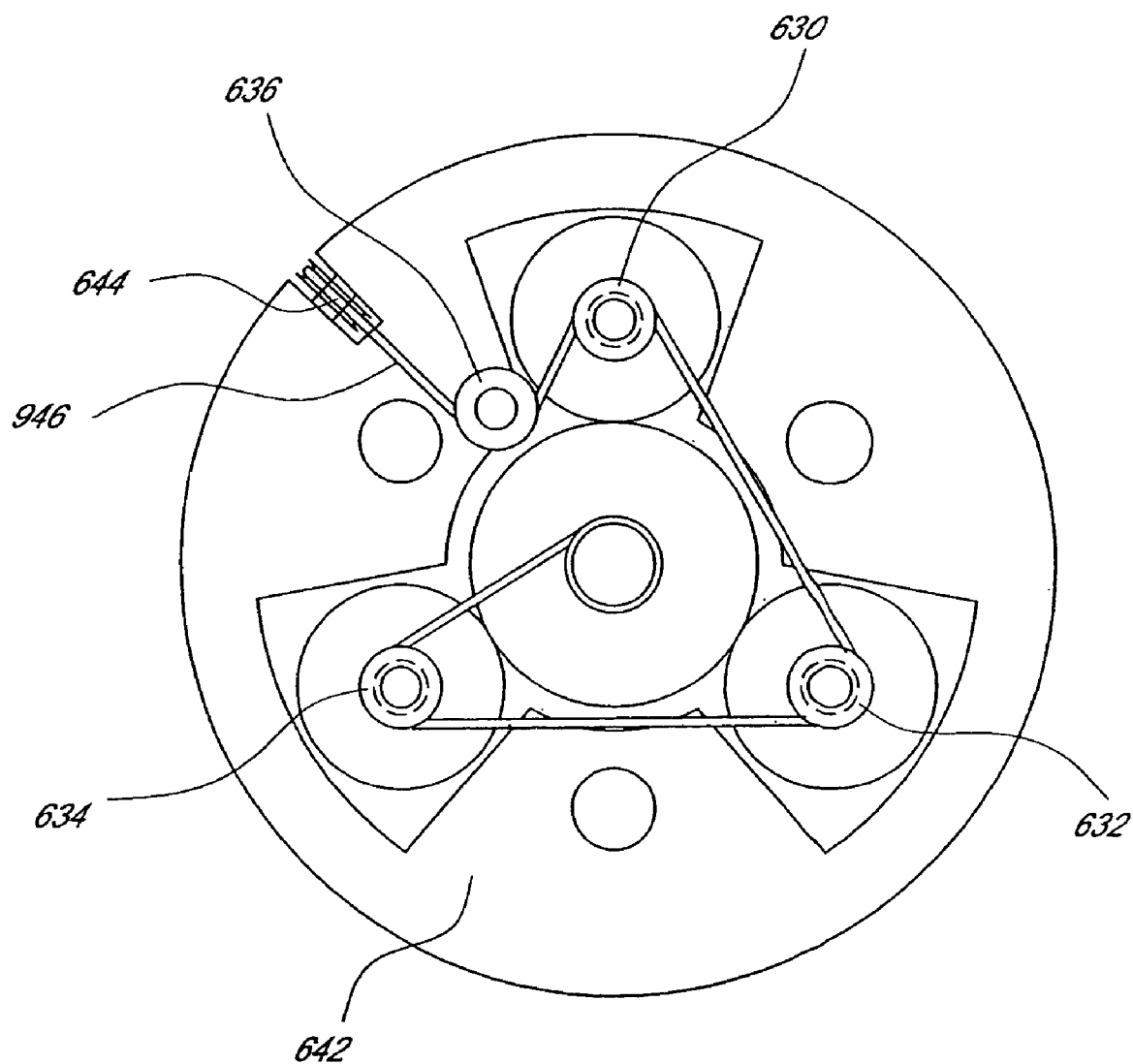
FIG. 16 is a schematic end view of the cable routing of the transmission shown in FIG. 13.

Referring to FIG. 16, shifting of the transmission 900 is accomplished with a single cable 946 that wraps around each of the spindle pulleys 630, 632, 634. At one end, the single cable 946 is attached to a non-moving component of the transmission 900, such as the hollow shaft 10 or the stationary support 5a. After traveling around each of the spindle pulleys 630, 632, 634 and the spacer pulleys 636, 644, the single cable 946 exits the transmission 900 through a hole in the housing 902. Alternatively a rod (not shown) attached to one or more of the spindles 3a, 3b, 3c, may be used to shift the transmission 900 in place of the single cable 946.

Figure 17:
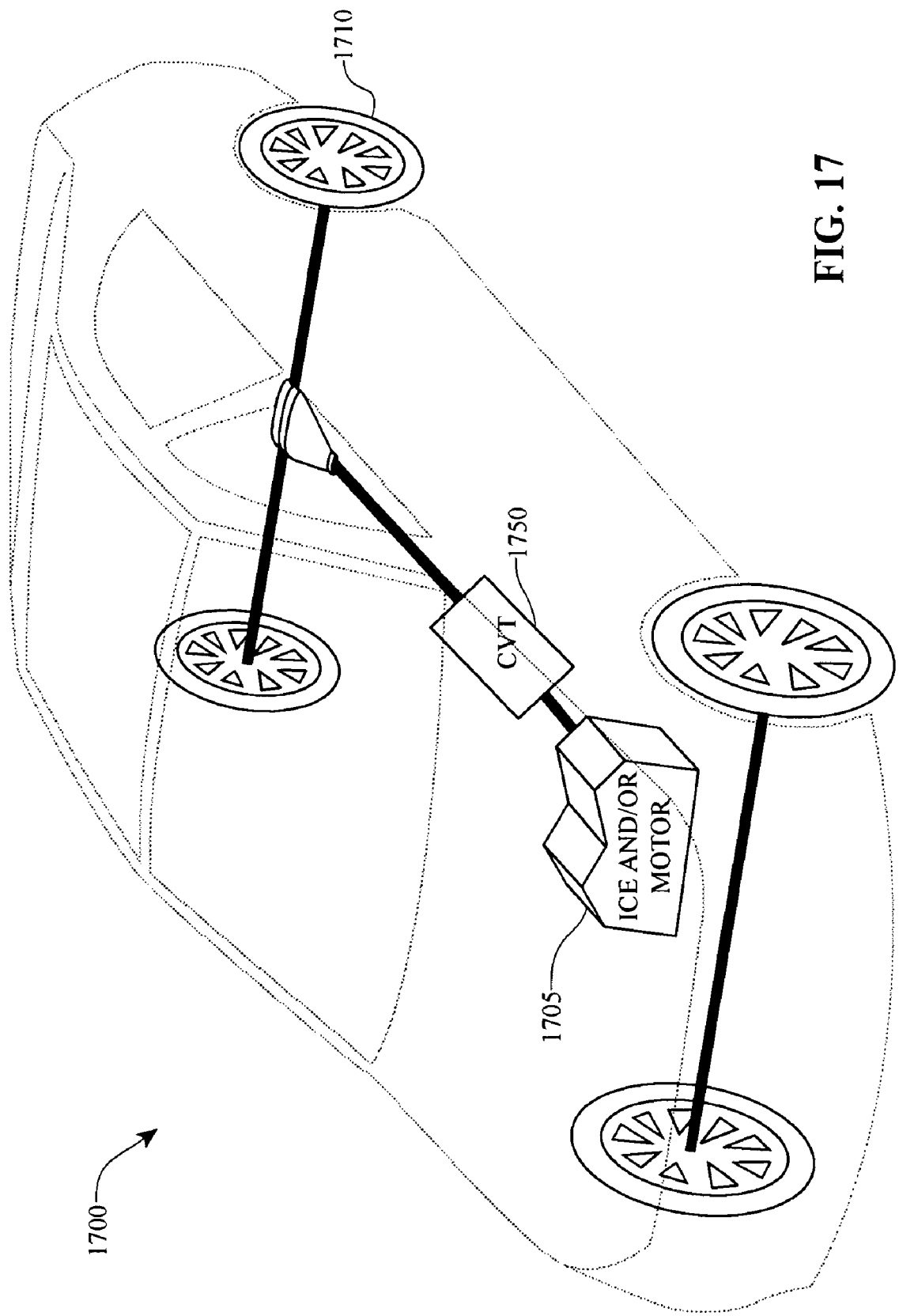
FIG. 17 is a schematic representation of an automobile that uses a continuously variable transmission.

FIG. 17 shows an automobile 1700 having a CVT 1750 (such as, for example, the CVT 100 of FIG. 1) coupled between an internal combustion engine and/or a motor 1705. An automobile is a usually 4-wheeled automotive vehicle designed for passenger transportation on streets and roadways and commonly propelled by an internal-combustion engine. A motor is a source of mechanical power, which can be in some embodiments a rotating machine that transforms electrical energy into mechanical energy (that is, an electric motor). The drive wheels 1710 of the automobile 1700 are operationally coupled to the CVT 1750.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. An automobile comprising:
    a motor or an internal combustion engine;
    a continuously variable transmission coupled to the motor or the internal combustion engine and the drive wheels of the automobile, the continuously variable transmission having a plurality of power adjusters, each power adjuster adapted to rotate about an axis centrally located within the adjuster;
    a shifting mechanism for the continuously variable transmission, the shifting mechanism comprising: at least one platform; and
    a plurality of spindle supports engaged with the platform such that the spindle supports adjust the axis of rotation of the power adjusters in response to axial movement of the platform.

2. The automobile of claim 1, further comprising a spindle for each power adjuster, the spindle located within the power adjuster, and wherein each spindle support comprises a bore for receiving one end of a spindle.

3. The automobile of claim 1, wherein the platform comprises a convex surface.

4. The automobile of claim 3, wherein each spindle support comprises at least one wheel that is slidingly engaged to the convex surface of the platform.

5. The automobile of claim 1, additionally comprising:
    a hollow shaft having at least one slot;
    a sleeve that is slidingly and coaxially positioned over the hollow shaft;
    a pin contacting the sleeve through the slot in the hollow shaft; and
    wherein the platform contacts the sleeve and moves axially in response to axial movement of the sleeve and the pin.

6. A method of regulating torque transmission in an automobile, the method comprising:
    providing a torque input from a motor or an internal combustion engine of the automobile;
    applying the torque input to a first rotatable member mounted on a shaft;
    contacting the first rotatable member to at least one traction roller having a spindle about which the traction roller rotates;
    contacting the traction roller to a second rotatable member mounted on the shaft;
    providing a spindle support attached to one end of the spindle; and
    providing a platform adapted to engage the spindle support such that the spindle support adjusts an axis of rotation of the traction roller in response to at least in part axially sliding the platform along the shaft.

7. The method of claim 6, further comprising mounting a rotatable annular member on the shaft and positioning the annular member between the rotatable disks.

8. The method of claim 7, further comprising frictionally contacting the traction roller to the annular member.

9. The method of claim 8, further comprising sliding the annular member axially along the shaft in response to an axial sliding of the platform.

10. An automobile comprising:
    a motor or an internal combustion engine;
    a continuously variable transmission coupled to the motor or the internal combustion engine and the drive wheels of the automobile, the continuously variable transmission comprising:
        a rotatable driving member mounted on a shaft;
        a plurality of power adjusters in frictional contact with the driving member;
        a rotatable support member mounted on the shaft, capable of axial movement along the shaft, and in frictional contact with the power adjusters; and
        a first platform positioned on a first end of the support member and adapted to move axially along the shaft with the support member.

11. The automobile of claim 10, further comprising a rotatable driven member in frictional contact with the power adjusters and the support member.

12. The automobile of claim 11, further comprising a second platform positioned on the second end of the support member and adapted to move axially along the shaft with the support member.

13. The automobile of claim 12, wherein the first and second platforms each comprises a convex surface.

14. The automobile of claim 10, wherein the motor comprises an electric motor.

15. The automobile of claim 10, comprising an internal combustion engine and an electric motor.

16. The automobile of claim 13, wherein each of the power adjusters is spherical in shape and comprises a through central bore.

17. The automobile of claim 16, further comprises one spindle for each power adjuster, the spindle positioned in the central bore.

18. The automobile of claim 17, further comprising at least one spindle support for each spindle, the spindle support having a bore for receiving one end of the spindle.

19. The automobile of claim 18, wherein the spindle support tilts the axis of rotation of its corresponding power adjuster by adjusting the position of the spindle in response to an axial movement of at least one of the first and second platforms.

20. The method of claim 6, wherein applying the torque input comprises applying indirectly the torque input.

* * * * *